(12) United States Patent
Dempski et al.

(10) Patent No.: US 7,631,327 B2
(45) Date of Patent: Dec. 8, 2009

(54) ENHANCED CUSTOM CONTENT TELEVISION

(75) Inventors: Kelly L. Dempski, Evanston, IL (US);
Ryan C. Horner, Evanston, IL (US);
Dax A. Fohl, Mount Prospect, IL (US)

(73) Assignee: Accenture Global Services GmbH, Schaffhausen (CH)

( * ) Notice: Subject to any disclaimer, the term of this patent is extended or adjusted under 35 U.S.C. 154(b) by 865 days.

(21) Appl. No.: 09/924,669

(22) Filed: Aug. 8, 2001

(65) Prior Publication Data

US 2003/0033157 A1 Feb. 13, 2003

(51) Int. Cl.
*H04N 7/10* (2006.01)
(52) U.S. Cl. .............................. 725/34; 725/32; 725/42; 725/45; 725/46; 725/47; 725/49
(58) Field of Classification Search ................... 725/32, 725/34, 42, 45–47, 49
See application file for complete search history.

(56) References Cited

U.S. PATENT DOCUMENTS

| | | | | |
|---|---|---|---|---|
| 4,930,158 | A | * | 5/1990 | Vogel ........................... 386/94 |
| 5,600,368 | A | | 2/1997 | Matthews, III |
| 5,774,172 | A | | 6/1998 | Kapell et al. |
| 5,774,664 | A | * | 6/1998 | Hidary et al. ................ 725/110 |
| 5,781,228 | A | | 7/1998 | Sposato |
| 5,844,620 | A | | 12/1998 | Coleman et al. |
| 5,907,323 | A | | 5/1999 | Lawler et al. |
| 6,018,768 | A | | 1/2000 | Ullman et al. |
| 6,088,722 | A | * | 7/2000 | Herz et al. ................... 709/217 |
| RE36,801 | E | | 8/2000 | Logan et al. |
| 6,122,011 | A | * | 9/2000 | Dias et al. .................... 348/569 |
| 6,169,541 | B1 | | 1/2001 | Smith |
| 6,177,931 | B1 | * | 1/2001 | Alexander et al. ............ 725/52 |
| 6,233,389 | B1 | | 5/2001 | Barton et al. |
| 6,240,555 | B1 | * | 5/2001 | Shoff et al. .................. 725/110 |
| 6,264,559 | B1 | | 7/2001 | Lawrence et al. |
| 6,357,042 | B2 | * | 3/2002 | Srinivasan et al. ............ 725/32 |
| 6,437,836 | B1 | * | 8/2002 | Huang et al. ................. 348/734 |

(Continued)

FOREIGN PATENT DOCUMENTS

CA 2387386 * 4/2001

(Continued)

OTHER PUBLICATIONS

International Search Report, dated Jan. 31, 2003, for corresponding international application No. PCT/EP02/08816.

(Continued)

*Primary Examiner*—John W Miller
*Assistant Examiner*—Sumaiya A Chowdhury
(74) *Attorney, Agent, or Firm*—Brinks Hofer Gilson & Lione

(57) ABSTRACT

The present invention includes a system and method for combining television broadcast programming content with customized or personalized information and educational or entertainment content. The system includes a set-top box capable of receiving data transmissions and locally rendering video animation for display with, instead of and/or synchronized with television broadcast programs in a way that the television viewer sees a coherent seamless merging of the television program content and supplemental content sources in an indistinguishable format. Preferably, the viewer may interact in real-time with the enhanced television programming to provide a higher level of engagement and customization potential.

23 Claims, 3 Drawing Sheets

U.S. PATENT DOCUMENTS

| | | | |
|---|---|---|---|
| 6,539,423 B1* | 3/2003 | Ebert | 709/219 |
| 6,601,237 B1* | 7/2003 | Ten Kate et al. | 725/47 |
| 6,698,020 B1* | 2/2004 | Zigmond et al. | 725/34 |
| 6,728,713 B1* | 4/2004 | Beach et al. | 707/10 |
| 6,738,808 B1* | 5/2004 | Zellner et al. | 709/223 |
| 6,829,711 B1* | 12/2004 | Kwok et al. | 713/183 |
| 6,832,084 B1* | 12/2004 | Deo et al. | 455/419 |
| 6,973,669 B2* | 12/2005 | Daniels | 725/112 |
| 7,020,888 B2* | 3/2006 | Reynolds et al. | 725/34 |
| 7,159,232 B1* | 1/2007 | Blackketter et al. | 725/38 |
| 2002/0029384 A1* | 3/2002 | Griggs | 725/46 |
| 2002/0063714 A1* | 5/2002 | Haas et al. | 345/473 |
| 2002/0184237 A1* | 12/2002 | McFeely | 707/104.1 |
| 2003/0016673 A1* | 1/2003 | Pendakur et al. | 370/394 |
| 2003/0093353 A1* | 5/2003 | Ward et al. | 705/36 |
| 2005/0097599 A1* | 5/2005 | Plotnick et al. | 725/32 |
| 2005/0138656 A1* | 6/2005 | Moore et al. | 725/45 |

FOREIGN PATENT DOCUMENTS

| | | | |
|---|---|---|---|
| JP | 08-063482 | | 3/1996 |
| JP | 09-288699 A | | 11/1997 |
| JP | 11-259930 A | | 9/1999 |
| JP | 2000-308094 A | | 11/2000 |
| JP | 2001-111921 A | | 4/2001 |
| WO | WO 97/22207 | | 6/1997 |
| WO | WO 98/48566 | * | 10/1998 |
| WO | WO 00/33578 | | 6/2000 |
| WO | WO 01/28236 A1 | | 10/2000 |

OTHER PUBLICATIONS

Fischetti, M., "The Future of TV," *Technology Review*, Nov. 2001, pp. 35-40.

"Video Games as Ad Medium?" http://www.consolewire.com/news/item.asp?nid=1175, May 2, 2001, 3 pgs.

"Boxster, GeForce 256 launch demo," http://developer.nvidia.com/view.asp?ID=Boxster, Nov. 22, 1999.

Gena, C. And Ardissono, L., "On the Construction of TV Viewer Stereotypes Starting from Lifestyles Surveys," *Proc. UM2001 Workshop on Personalization in Future TV*, Sonthofen, Germany, Jul. 2001.

Hua, K.A., Ying, C., and Sheu, S., "Patching: A Multicast Technique for True Video-on-Demand Services," *Proc. 6th ACM Int'l Multimedia Conf.*, Sep. 1998, pp. 191-200.

Translation of Japanese Office Action, dated Feb. 18, 2008, for corresponding Japanese Pat. App. No. 2003-520191.

* cited by examiner

ENHANCED CUSTOM CONTENT TELEVISION

BACKGROUND

Historically, television content has been based on a business model of a common network programming media content being pushed to a mass nationwide audience. Local network television broadcasters had the option of inserting local advertising in some of the commercial breaks or perhaps pre-empting the network programming for local programming. Still, the effect was the same of pushing a common content on a mass audience, thought limited in a geographic region.

Past efforts in "interactive T.V." have focused on a variety of "interactions" including an interactive television programming guide, video-on-demand, pay-per-view, and Internet web pages displayed on the television. These latter efforts have maintained a clear difference between the web pages and television programming. The Internet content typically appears in a separate PIP-format window overlaying or next to the television program.

What has been lacking, however, has been a means to seamlessly merge the two content sources. What is needed is a richer television viewing experience that provides customized, personalized, interactive enhancements that can take advantage of today's and tomorrow's higher broadband connectivity with alternative multimedia content sources and low-cost, powerful graphics and multi-media image processing technology.

SUMMARY

The present invention is intended to take advantage of today's increased multimedia processing capability to provide customized personalized interactive enhancements to television broadcast programs. In a first embodiment, the present invention is directed to a method for enhancing a television broadcast program by receiving television broadcast programs and broadcast advertising segments, receiving replacement advertising data where the advertising data represents an instruction set for rendering into an animated video segment by a client processor, rendering on the client processor the replacement advertising segment, blocking the display of the television broadcast advertising, and displaying the replacement advertising segment on a television display.

In a second embodiment of the present invention, a method is provided for enhancing a television broadcast program by receiving programming data representing synchronization data for a plurality of sequential program segments in a television broadcast program, receiving information related to a plurality of replacement program segments, selecting a desired replacement segment, synchronizing the replacement segment with one of the plurality of television broadcast segments, receiving data representing the selected replacement segments, blocking the display of the television broadcast segment, and then displaying the replacement segment on a television display in place of the synchronized television broadcast segment. Preferably, the replacement segment is selected based upon a viewer profile. Optionally, the data representing the selected replacement segment may comprise an instruction set for rendering into an animated video segment by a client processor.

In a third embodiment of the present invention, a method is provided for enhancing a television broadcast program comprising receiving the television broadcast program, receiving supplemental informational data from a first memory storage, rendering on a client processor supplemental video content from the supplemental data and displaying the television program with the supplemental video content images displayed over portions of the television program on a television display. Preferably, the supplemental video image content is informationally related to the displayed television broadcast program. Preferably, the informational data represents financial information associated with the content of the television broadcast program or with the view profile. Optionally, the supplemental video content images may be altered in response to an input from a manual input device under the control of a viewer.

DETAILED DESCRIPTION OF THE INVENTION

The seamless merger of television programming and additional or alternative multimedia content sources is referred to herein as "enhanced television." The present invention is directed to a system and method for combining television broadcast programming content with customized or personalized information and educational or entertainment content in a way that the television viewer sees a coherent seamless merging of the content sources in an indistinguishable format. Preferably, the viewer may interact in real-time with the enhanced television programming to provide a higher level of engagement and customization potential.

Recently, commercially available television set-top boxes and video game consoles have both Internet connectivity and impressive graphics performance. This year, the introduction of video game machines such as the Sony Play Station 2 and the Microsoft Xbox means that the typical living room now has more multimedia processing power than most personal computers. New television sets are widely available that have digital capabilities. Personal digital video recorders, such as available from TiVo, Inc., allow for the time shifting of television broadcasts at a time sequence and period desired by and under the local control of the individual viewer.

All these technologies provide a robust platform for rich media applications. This equipment paves the way to implement and generate customized television quality content on individual television sets. Examples may include customized advertising, customized news programming, individualized commercials and unique connectivity with the on-line community through the television sets. Thus, in contrast to present attempts at interactive television that concentrate on doing most of the data processing on the backend systems and streaming video media out to the viewer, certain embodiments of the present invention takes advantage of the client-side technology to generate locally for each viewer the displayed video media with a more emersive level of interactivity than merely selecting different media streams delivered by a backend server.

Figure 1:
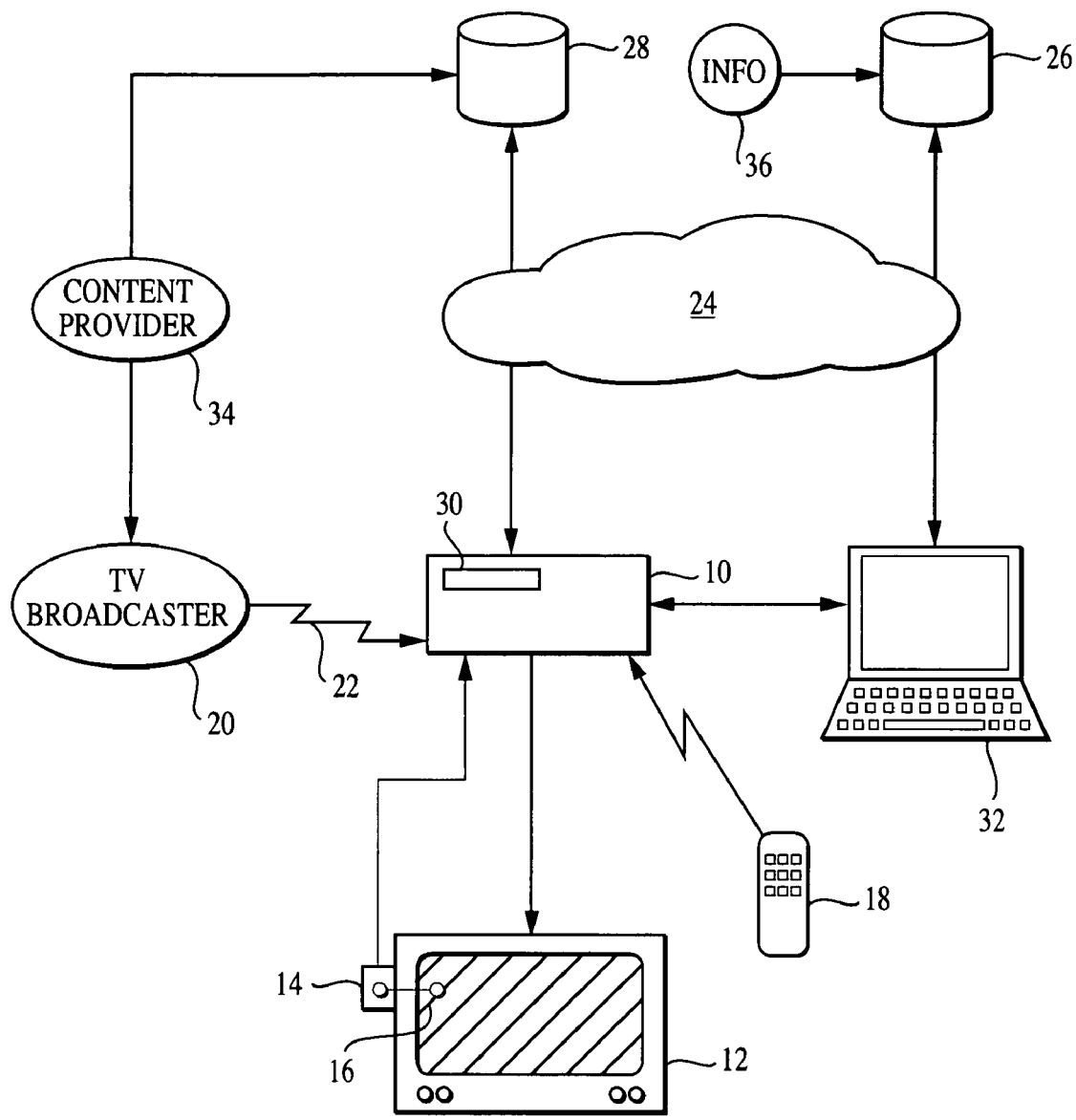
FIG. 1 is a schematic of one embodiment of a system for providing enhanced custom contact television.

One embodiment of a system for providing enhanced custom content television programming is depicted in FIG. 1. The television set-top box 10 is the control center for providing the personalized television programming. Although referred to herein as a "set-top box," the enhanced television controller may be located in a variety of places in a viewer's home, or incorporated with other hardware such as, but not limited to, the television video display monitor, a separate personal computer, home theater audio/visual equipment, etc. Also, the set-top box controller may be located off the premises such as at a local cable provider's distribution center, which would require broadband connectivity with other components of the system.

Preferably, the set-top box 10 has a video output connection to a television set or video display monitor 12. The video output could be either analog or digital, depending on the input capabilities of the monitor 12. The display monitor 12 may be adapted to include a touch sensitive input device 14 overlaying the display screen 16. The set-top box may be operated through use of a remote controller 18 using on-screen menus for more complicated commands.

Alternatively, the remote controller 18 may be a personal digital assistant (PDA) with a touch sensitive display and an infrared tranceiver for communication with the set-top box. The set-top box may transmit a data set for the PDA to use to reconfigure the display into a set of buttons that correspond to the active selections or menu available for interaction with a given image being displayed on the monitor 12. For normal television programming, the active buttons may be volume adjustment, channel adjustment, etc. For an interactive enhanced programming, the active buttons may include fast, slow, freeze, color adjustment, camera angle, zoom-in/out. Additional menu buttons on the PDA display may include specific links to display graphs, charts, or links to additional overlay content, selection of background images, selection of background music, etc. depending on the image displayed on the monitor, and level of detail traveled in the hierarchical menu of selections.

The set-top box 10 receives television broadcast programming signals 20 either through standard wireless transmissions 22, broadband cable connections, broadband satellite transmissions, or other means for connectivity. The set-top box is also connected through a broadband connection, such as through the internet 24 or other external communications networks, to data sources 26 and multimedia content sources 28. Multimedia content providers 34 may provide interrelated multimedia content for both television broadcasters 20 and multimedia sources 28. This supplemental multimedia content is received by the set-top boxes and processed for enhanced custom content television viewing on an individual's home television 12. Independent multimedia content providers may also provide the enhanced supplemental content to display with the television programming. Optionally, the added multimedia content may come from CD-ROM's or DVD's placed in the optical drive 30 of the set-top box 12.

The set-top box may also be connected with an individual's home computer 30 for access to personal data stored on the individual's personal computer ("PC") or is available through the PC's connection with the internet 24 or other external communications network. Likewise, the PC may be used as an alternative interface for programming or setting up the set-top box for personalized enhanced television programming. The PC may also store a music catalog owned by the viewer from which the set-top box may retrieve the viewer's favorite music for customized audio accompaniments or backgrounds for enhanced programming as described in further detail below.

Preferably, the set-top box 10 has the sufficient image processing, graphics capability and memory storage to seamlessly integrate the television broadcast and digital multimedia content in real time. The set-top box may accept analog or digital television broadcasts, strip off embedded codes in the broadcast that instructs the set-top box from where multimedia content sources 28 or additional data content 26 can be located and downloaded for integrating with the television broadcast. The content sources 28 may provide alternative content options that the set-top box may select based upon the individual's preferences or profile.

The system may customize or personalize the television broadcasts automatically based on viewer's stored preferences profiles. The preferences or profiles may be stored on the set-top box, on the PC, at the content source, or on other storage devices that the set-top box is in communication with either in the viewer's home or outside. The preferences and profiles may be stored for a number of different individuals, i.e., family members, regularly watching the enhanced television content. The system may also have preferences established by day and time segments to automatically use preferences for viewing hours generally watched by children, teens, young adults or parents in the home. The system preferably may use these default preferences, or a viewer may input a code representing his identity so the system will deliver television programming enhanced for his preferences rather than the default preference.

A viewer's profile or preference may consist of a variety of data or information that characterizes the demographics and/or viewing preferences of the viewers in the household. For example, the profile may include demographic information such as age, gender, ethnicity, income level, zip code and the like. Also, profiles could include information relating to a person's financial information such as any investment portfolios and information related to account numbers and URLs where such information can be located and found on the internet. A profile could also include a list of information of major purchases of the viewer for possibly a wish list of future purchases desired by the viewer. Preferences may include viewing specifics such as types of programs frequently watched, hobbies or other interests. Preferences may also include shopping or purchasing habits of the viewer. Preferences could also be related to the level of interactivity desired by the viewer with the television enhancements. In many cases, data attributable to a preference may also be considered a profile, and information that is part of the profile could also be considered to be a viewer preference. The description of preferences and profiles and the information that would be suitable for one or the other will be apparent in connection with the description of the preferred methods of the various embodiments of the invention as discussed further below.

The set-top box 10 preferably can store both the television broadcast signal and the supplemental multimedia and data content, and then synchronize and assemble the multiple content for display in real-time, or at a later time depending on the individuals viewers preferences. Since the system may provide complete interactivity, the viewer may be able to adjust the content being viewed "on the fly." To accomplish this, the system preferably has the video image processing capability to render photo-realistic video images from instructions sets or other such information data obtained from the supplemental content data sources. From this data, the client processor in the set-top box may render three-dimensional video images, much like shared data communicated between clients on a networked computer video game system can render multi-player video game images. The system may be able to "reconfigure" the merged content nearly instantaneously by replacing the supplemental content at command of the viewer. The system may preferably be able to freeze the display, replay, slow motion, and fast forward the video and audio stream while capturing and storing all of the desired incoming broadcasts for viewing seconds, minutes, hours or days later, as desired by the individual viewer.

In a preferred embodiment, the set-top box may be considered to have the capabilities of personal digital television recorders, internet-capable video game players and computer video workstations. The digitized television signals and computer-generated supplemental video images from the set-top box being displayed preferably appear in the same quality as television broadcast signals today.

For example, such a system may include a set-top box having an Intel Pentium III processor with 256 MB RAM memory, a graphics card having a nVidia geForce3 chip, a DVD optical drive, a television (or a SVGA computer monitor) and a keyboard in communication with the set-top box. The incoming television broadcast program may be digitized and stored as a MPEG4 format file on a 40 GB hard drive memory storage. The supplemental video content may be an executable instruction set written in Visual C++ and using Microsoft Direct X8 SKD. The system is capable to transmit to the monitor for display the television broadcast program, the rendered supplemental video image content, or a combination of the supplemental video on top of and/or synchronized with the television broadcast program.

A system having the aforementioned capabilities may be suitable for providing a variety of enhanced television viewing modalities.

The present invention includes several embodiments of methods that are directed at enhancing the advertising experience with television. With a set-top box that is capable of rendering photo-realistic video images in real time from downloaded instruction sets, akin to high resolution computer 3-D video games, a viewer can experience the quality of normal television broadcast advertising in a creative and engaging experience.

In one such embodiment, the method provides an enhanced television broadcast program with replacement advertisements rendered on the set-top box and displayed instead of the television broadcast advertisement accompanying the program. Preferably, the replacement advertising segment is selected based on a viewer profile or preference stored in the system. The replacement advertising segment may be altered or modified by the viewer interacting with the segment and selecting a variety of commands.

Figure 2A:
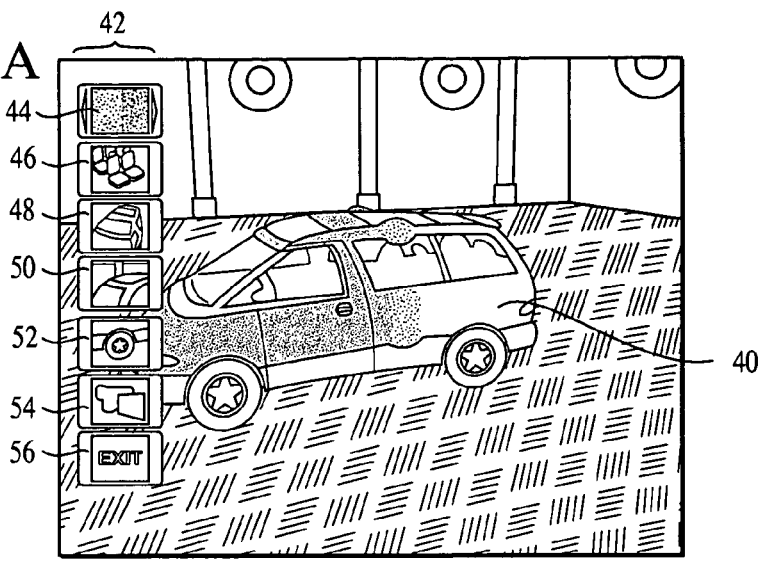
FIGS. 2A, 2B and 2C are representative images from a client-rendered advertising segment.
Figure 2B:
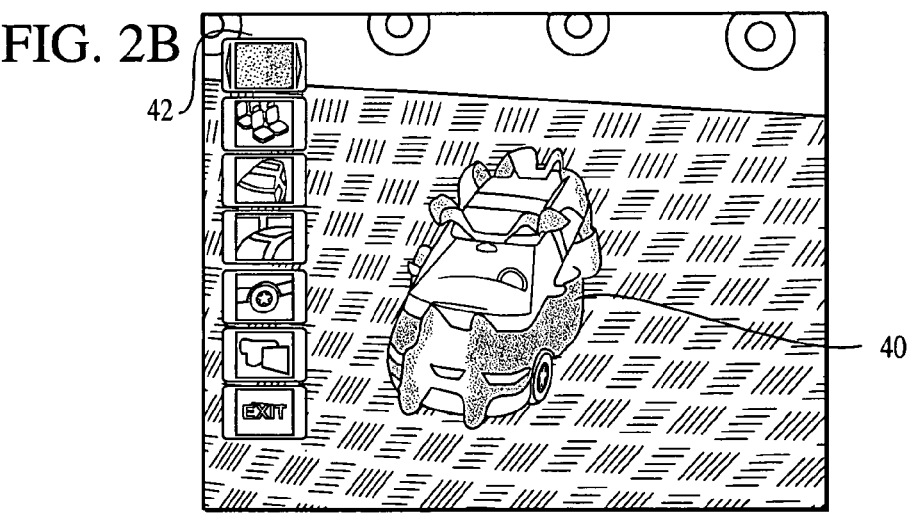
Figure 2C:
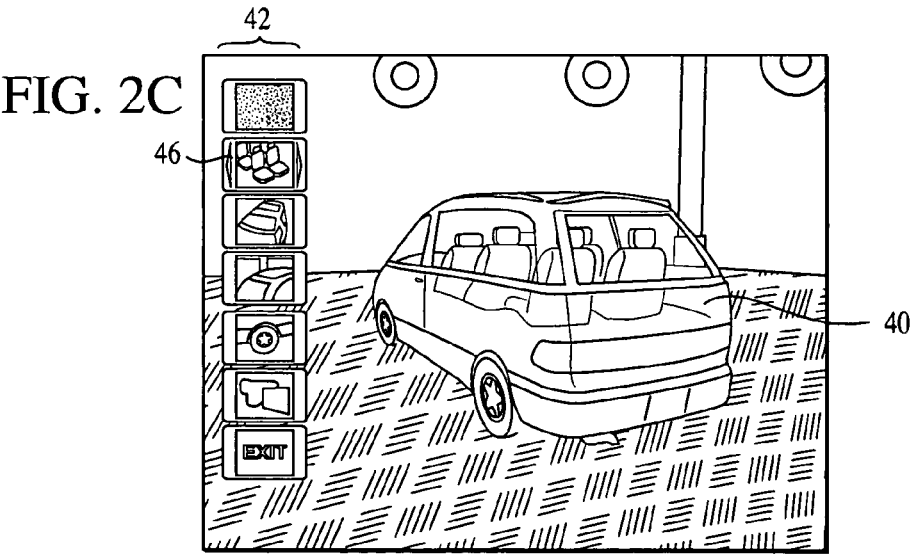

For example, during an automobile commercial, as depicted in FIGS. 2A, B and C, the viewer can interact with the commercial to change vehicle options or colors of the displayed vehicle to suit his taste. With the viewer's set-top box rendering the animated video images of the car commercial, the vehicle 40 can be changed to be viewed from any preferred perspective as shown in FIGS. 2A, B or C. Likewise, options to alter the appearance of the vehicle may be selected through the selection of menu buttons 42 shown on the left of the display. These options may include color changes 44, seat configuration 46, sunroof 48, roof rack 50, tire style 52, save selection 54 and exit advertisement 56. With computer-generated images, special effects, such as ripple-wave color transitions (FIG. 2A) or multi-zone ripple-color transitions to appear as a color explosion (FIG. 2B) are at the command of the viewer. Typically, special effects are computer-generated images that are unrealistic, i.e., do not normally occur in the known environment. But the special effects in this embodiment may also include changes in the background, such as switching the commercial's background color, or changing the location scenery in the background, e.g., country-side to urban environments. Likewise, interior configuration changes may be visible by changing the vehicle exterior to a "transparent skin" (FIG. 2C).

The soundtrack accompanying the commercial can be altered depending on the taste of the individual viewer. This video and audio content can be delivered by the multimedia content source and selected based on demographics or profiles of the viewer, or selected form the viewer's favorite music stored locally on the set-top box or PC. Likewise, the background scenery may change depending on the viewer profiles. For example, the background may be mountain scenery for nature lovers, or city background for urban dwellers.

The viewer may interact with the commercial to stop or freeze the video, go backwards or forward on a commercial and spend as much time as he would like with the particular product, rather than the present 15 or 30 seconds of a fixed commercial. Since the set-top box preferably has the ability to record television while displaying personalized multimedia programming, after the viewer has his "feel" of the commercial personalized to his preferences, the set-top box can store those preferences in memory and then begin displaying the delayed broadcast program.

In addition, the set top box can retain the particular settings that a viewer may have selected for a commercial as part of the viewer preferences so that future commercials of that product will be display with the same settings. Likewise, the set top box can "learn" of the viewer's preferences by his interaction with the commercial, and thereby build a viewer profile that may be used to automatically select certain actions on other commercials that meet the interest captured in the viewer's profile. This means that advertisers can deliver commercial content that includes optional substitutable content that can be customized or personalized based on viewer's profiles or demographics.

In addition to customizing individual commercials, the viewer may have the option of seeing alternative commercials. During a commercial break for a television program a variety of different commercials of different products may be selectable by the viewer such as selecting between commercials for insurance or commercials for a pizza. Alternatively, if a company decides not to share its time with other companies (and preferably pays a premium to the broadcaster for that privilege), it can offer a selection among a variety of its own products to viewers during that time slot based on the viewers' profiles. One example of this may be illustrated with an automobile commercial. A recent purchaser of an automobile may receive a commercial for auto service, whereas a person who has not purchased an automobile recently would receive a commercial for a new automobile.

The custom commercials may also be enhanced by allowing interactivity and connectivity to the advertiser so that the viewer can place orders instantaneously upon viewing the commercial. Thus, delivering content of more interest, intimacy and immediacy to the viewer can strengthen the relationship between the viewer and the seller. This can also be used to capture more sellers by providing viewers the means to make impulse purchases while viewing a commercial.

The present invention, in other embodiments, can be used to achieve a goal long sought by television advertisers, that is, to engage and absorb the attention of the television viewing audience. Viewers attention may enhanced by turning television commercials into interactive video games. For example, a television commercial may include game contests requiring the viewer to view the commercial over and over again to discern level of details to answer questions about the commercial for prizes. In contrast to video streams, executable code, geometry and textures can be quickly transmitted to the viewer's set-top box. As a three-dimensional graphic animation being rendered on the set-top box, the commercial may be displayed from a variety of different perspectives. In the game contest, certain events or information or objects may be seen only at certain angles or perspectives are necessary for the television viewer to view to obtain appropriate information to answer the quiz or contests.

The commercials may use the enhanced interactivity to set up "advergaming" experiences to draw the viewer in a more intimate relationship with the advertised product. One example may be an interactive beer commercial where the viewer directs the action or interacts with talking frogs. Prizes including merchandise displaying the particular brand of beer logo may be offered to motivate the viewer to try to achieve a certain goal within a short time appropriate to a commercial, e.g., 30 seconds, such as getting the frogs to say certain things, or jump to a certain lillypad, for example. Such "advergaming" may be applied on a networked community level so that the action of the directed objects are dictated by the popular vote of the community interacting with the commercial in real-time. Such a community-directed action may build a "pseudo-community" among the viewers that can further enhance the product's image by the shared collective experience of consumers interacting with their peers both during the commercial and later talking about the "shared experience" when communicating with each other. The games or contest may have direct relation to the marketed product or be unrelated to the product, using the product as a commercial lead-in for the interactive gaming segment "hosted" by the marketed product.

These interactive games in place of traditional commercials may be extended to longer programming. For example, children's television cartoons, some of which today are computer generated animation, may be converted to interactive video games, or include optional segments that are interactive video game-type scenes. The children may direct the plot development, or control the characters to help the heroes fight the evil villains, or vice versa.

In addition to commercials that are purely computer-generated images, the commercials can be combinations of real images with computer-generated virtual objects superimposed on the real image. While this result has already been seen in movies, it can also be accomplished in accordance with another embodiment of this invention. For example, it is very common to see product placements in movies and T.V. shows that are paid for by the seller of the product. This idea can be further augmented so that the product placements on television programs are virtual and sold per display by generating the virtual visible products superimposed on the real television program through computer-generated animation by the set-top box at the viewer's home. Thus, every time a show is broadcast or re-run, the television broadcasters have an opportunity to re-sell the soda can product placement to a different vendor. Also, a selection of a variety of product placements can be provided that are customized to the preferences, profiles, or demographics of the individual viewer.

The present invention may also provide a method for enhancing the content of other advertising concepts on television. Applying the interactive mode for allowing the viewer to interact and direct the content and progression of advertising commercials, the viewer can obtain more tailored content for his personal needs. For example, commercials for financial products, such as mortgages, insurance, or other investments may allow the viewer to select particular products and have visualizations or graphs displayed showing the relative investment returns, net present values, income, cash flow or payments streams associated with those products. Having the viewer selecting a button on the television screen may send a signal via the internet to a content server that will transmit executable programming code to the viewer's set top box with instructions to render the particular visualizations selected by the viewer.

This method may be adapted and applied to enhance a variety of additional television commercial genres. Retail product commercials may include interactive visual product comparisons (such as in the form of graphs, bar charts, etc.) or additional product details to provide a virtual comparison shopping experience. Displayed buttons linking to information content from independent product shopping service internet servers may provide a wealth of relevant information for the viewer, and can be tailored based on the viewers stored profile or preferences. For example, a commercial for a new drug may at the option of the viewer provide additional graphic comparisons of effectiveness with drugs that the viewer may currently be consuming. Graphic animations of how the drugs work may be displayed. Links may be provided for additional information related to the diseases that the drugs are intended to treat that may be displayed superimposed on the commercial, or as a replacement to the commercial display.

Commercials related to food products may also be enhanced with the present invention. For example, a commercial for a dry-packaged rice product may be displayed and either at the real-time command of the viewer, or based on the viewers profiles and preferences, additional content related to alternative recipes to the viewer's tastes may be displayed. An animated interactive simulation may be displayed allowing the viewer to virtually trying cooking the perfect rice dish, as might be envisioned in a realistic video computer game. Another example in the food products category may be a customized pizza commercial that displays only the types of pizzas with the ingredients preferred by the viewer. Likewise, television commercials for restaurants may be tailored to provide commercials for the types of food or ethnic dining preferred by the viewer's shopping or buying habits or as previously set-up by the viewer in his preferences.

Likewise, for the potential tourist, vacation commercials may be enhanced with selectable content that provides virtual tours or scenic 360-degree panoramas of tourist destination sites to motivate the viewer to select a vacation package or destination. Airlines may offer similar commercials with interactive options allowing viewers to see new features of the airlines, or even reserving flights or selecting seats for booked tickets. These commercials may be presented to the viewer based on past travel experiences or preferences stored in the system. Hotel guests may have locally generated interactive commercials displayed on the hotel room televisions showing local tourist attractions, hotel services, or locally provided entertainment experiences, such as casino/gambling games or contests.

Entertainment media may also take advantage of the present invention. New movies and new music albums may present trailers, samples, clips or sound bytes customized based on the viewer's profile or selected in real-time by the viewer. These short segments may selectively replace the television broadcast commercials that would be of no interest to the viewer based on their profiles.

Figure 3A:
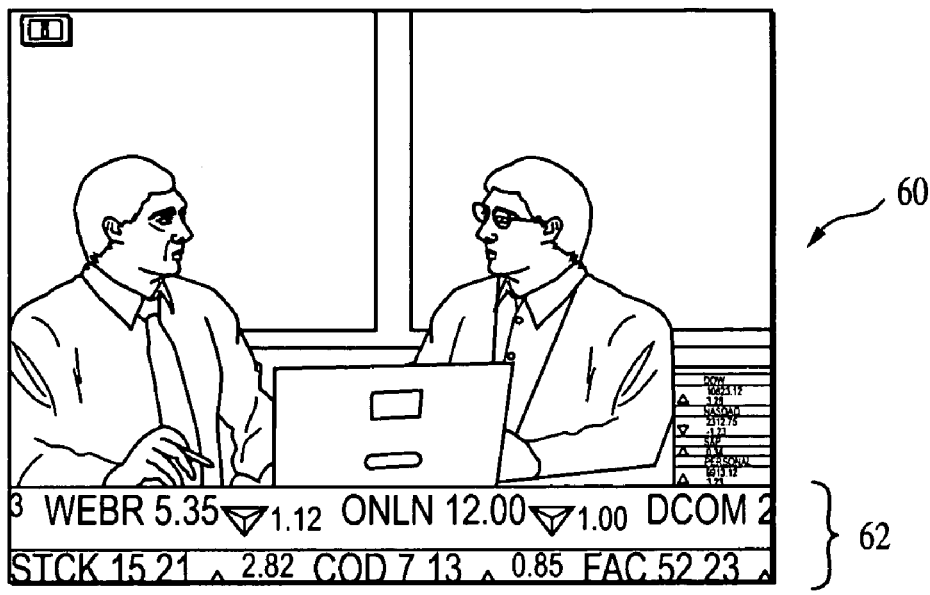
FIGS. 3A and 3B are representative images from an enhanced financial news television program.
Figure 3B:
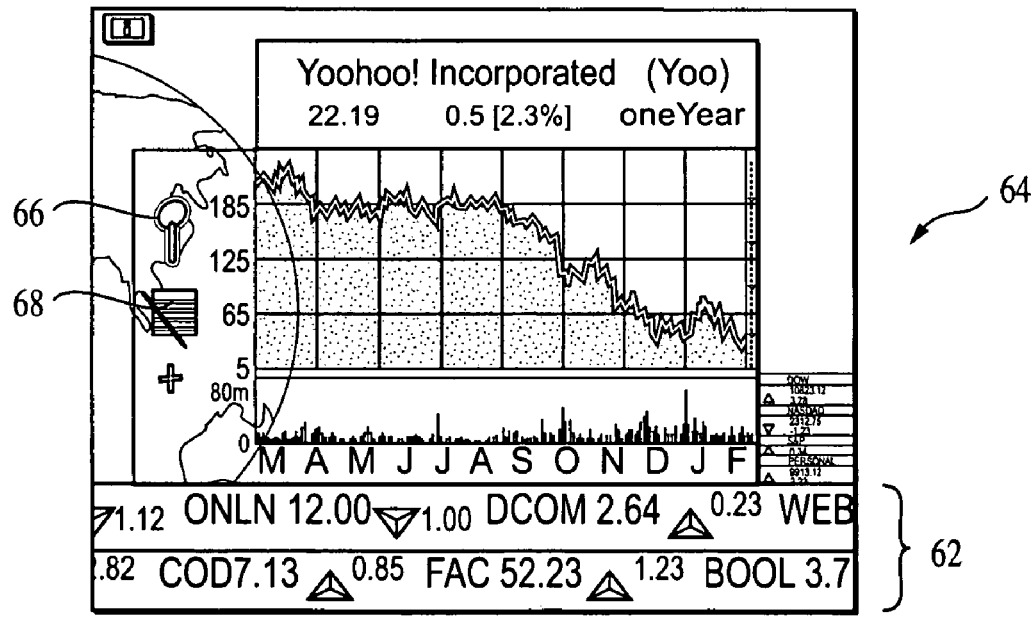

Because the present invention, in one aspect, provides client-rendered video animation superimposed on television broadcast programs, a method is provided to display a television broadcast program with superimposed client-rendered video images. These images are preferably informationally related to the broadcast program and selected based on the viewer profiles. For example, one embodiment is an enhanced television newscast based on the concept of a financial news television programming as shown in FIGS. 3A and 3B. In a typical financial news broadcast 60, reporters, analysts and experts discuss the latest news surrounding specific businesses or markets. In a preferred embodiment, the system can be programmed to display a variety of additional information content to enhance the information provided by the broadcast. Instead of the common variety of stock ticker quotes shown across the bottom of the screen that are under the control of the broadcaster or stock exchange, the individual viewer can select to have stock quotes or index quotes of his own choosing running across the bottom ticker tape 62 of the television screen.

The enhanced financial news broadcast may be enhanced in other ways. At the viewer's request, a chart 64 may be displayed on a television screen showing the latest stock price movement of the business that the news reporters are currently discussing or other stocks of the viewer's choosing. Also, the viewer may switch the views and formats of the information that appears on the screen at his choosing using menu buttons 66 on the screen. Likewise, the viewer can call up information regarding a personal portfolio of stocks. He may have the ability to annotate the system to record 68 the stock currently being discussed by the television programming and have the system and the intelligent internet agents gather information for research concerning a stock to be viewed at a later point and time. In addition, the information and programming can be connected with an online stockbroker so that the viewer can instantly carry out stock trades while viewing the customized programming.

This embodiment of a financial news broadcast and other embodiments may be implemented in different ways. For example, the data layer on the television broadcast signal may include encoded information in the vertical blanking interval (VBI) that tells the set top box to retrieve information from a specific Internet site or from an internal storage device such as a personal computer that includes information about the viewer's portfolio. Alternatively, the electronic programming guide from the cable provider may include such information synchronized to the specific relevant portion of the program.

The viewer can interact with the set-top box by using a remote control, or a keyboard connected to the top box or personal computer. Also, the viewer may use a touch-sensitive screen over the video display to take advantage of hidden and/or visible buttons being displayed along with the television programming. In addition, on-screen menus, such as drop-down or pull-down menus, may be used.

Displaying stock quotes and financial charts may not require as much multimedia graphics processing power or capabilities. But, other embodiments of the present invention that involve seamless integration of realistic animation with television programming may require such advance processing capabilities. The set-top box and related equipment preferably has the storage capacity, image processing power and broadband connectivity to be able to download and display video images with a high degree of three-dimensional realism in real time. Moreover the equipment needs to have the image processing capability or graphics processing capability to be able to animate three-dimensional images in real time.

In another embodiment of the invention, the viewer may take control of a live television broadcast much as a television program director will do in editing a television broadcast in real time. For example, most sporting events are televised using cameras located throughout the sports arena. The present invention may give the viewer the power and control to select from which camera he desires to view the event. The viewer may have control to do instant replays, slow motion, and add sports statistical data overlays on the screen of the league, the team, or individual players. Also, the scores of other games in progress may be shown in response to the command of the viewer. Computer generated images may be displayed, as is currently provided for football game broadcasts such as first-down line, player movement chalk-talks, billboard advertisements, etc. However, these enhancements may be provided at the command of the individual viewer, or by default based on the individual viewer's preferences. Likewise, the viewer may select alternate sportscasters or commentators to see and listen to. Some of this alternate content may be received from multimedia content providers delivering the television broadcast or from independent providers.

In another embodiment of the invention, instead of augmenting the content by overlaying different sources of data information on the television broadcast, the viewer may customize news broadcast by requesting a personalized sequence of news segments. In this embodiment, a half-hour television news program can be prepared and customized for many viewers by taping multiple news segments that may total one hour, and delivering to the individual television viewer only those segments that he desires or has an interest in viewing. For example, five minutes of a common news broadcast to all viewers can be followed by another five minutes of news segments where viewers have options of selecting between three or four different topical news segments, such as movie reviews, professional sports, local high school sports, or international sports. This may be followed by again another segment of comment news that is broadcast to everyone followed again by customized new segments that are either selected by the viewer or perhaps match the television viewers personal profile that is kept on a memory storage device. The memory storage device could be the set top box which then access the controller of the information and sends out a request for the specific segment that match the television viewer's criteria for streaming either in real time or ahead of time to the setup box for viewing at the appropriate time and sequence of the new broadcast.

The television broadcasting company may transmit all programs simultaneously and the set top box selects from which channel to grab the new segment to be displayed during the desired time segment. Alternatively, at the beginning of the program, the television broadcast may send a series of signals and with the time sequence and synchronization information with a list of URLs from which the set top box can retrieve the stored video new segments for video streaming or downloading and later display. Alternatively, the synchronization information and URLs may be transmitted with electronic programming guides and decoded by the set-top box.

The above various embodiments of the invention may be applied to other television programming in the news genre. Sports news programming may be enhanced with specific sports or athlete profiles. Plays of the week, month, year or century may be relived with video animation re-enactments where the viewer can control the viewing angle, replay speed and other features. Entertainment news programs may be similarly enhanced with celebrity profiles. Political news programs may be enhanced with profiles or segments about a viewer's political representatives or political leaders in the current news. Interactive polls may be taken and/or the results graphically displayed.

Much like the financial news program enhancements described above, weather news channels may be enhanced. Weather news of interest to the viewer may be instantly displayed, such as local weather, or upcoming travel destinations. The weather channel may include interactive buttons to allow the viewer to display client-generated graphics of weather information, such as temperature forecasts, either in a time graph or an geographic iso-temp map. Graphic animations showing satellite and radar information may be displayed on request of the user, for example. Realistic video animations of a weather news broadcaster may be rendered by the set-top box showing the animated weather person standing in front of a weather map providing the weather information of interest.

Of course, one skilled in the art may apply the invention to other programming genres based on the teaching herein. For example, a music video program may include a variety of different music video segments depending on the viewer's preferences. The background set on which the video disk jockey operates may be generated by the set-top box to provide a background that the viewer find most pleasing, at the viewer's command or generated based on the viewer's profiles. As well, celebrity profiles of interest may be selected during or instead of music videos.

Further, home shopping television programs and the like may be enhanced using the present invention. Product comparisons may be displayed. The viewer may select products of interest for comparison. Additional product details of interest to the viewer may be displayed. The products may be shown in the viewer's favorite colors or styles, etc. much as described above for the automobile commercial embodiment.

Educational programs may also be enhanced using various embodiments of the present invention. For example, nature or wildlife programs may include interactive set-top box animated features that allow the viewer to feed a wild animal, such as a shark, while a narrator talks about the animal's feeding habits or other related educational information. The viewer may select to have graphic visualizations of animal comparisons superimposed on the normal television program being displayed, such as showing relative size, speed, food consumption, heart rate, life span, or other pertinent characteristics of the wild animals alone or in comparison with other species.

While this invention has been shown and described in connection with the preferred embodiments, it is apparent that certain changes and modifications in addition to those mentioned above may be made from the basic features of this invention. In addition, there are many different types of computer software and hardware that may be utilized in practicing the invention, and the invention is not limited to the examples described above. Accordingly, it is the intention of the Applicants to protect all variations and modification within the valid scope of the present invention. It is intended that the invention be defined by the following claims, including all equivalents.

The invention claimed is:

1. A method for enhancing a television broadcast program comprising:
    (a) storing an incoming media stream on a first memory storage, the incoming media stream comprising a television broadcast program and a television broadcast advertisement for display during a break in the television broadcast program;
    (b) receiving replacement advertising data from a second memory storage, the advertising data comprising an executable instruction set for rendering a first animated video replacement advertising segment by a client processor;
    (c) selecting the first replacement advertising segment based on a viewer profile;
    (d) rendering on the client processor the first animated video replacement advertising segment by executing the executable instruction set;
    (e) blocking the display of the television broadcast advertisement, such that the television broadcast advertisement is not displayed;
    (f) displaying the first animated video replacement advertising segment instead of the television broadcast advertisement on a television display;
    (g) determining whether the television broadcast program has resumed after end of the television broadcast advertisement, determining whether the first replacement advertising segment has ended, and if the first replacement advertising segment has not ended, storing the resumed television broadcast program on a third memory storage from a beginning point, and displaying the resumed broadcast program from the beginning point;
    (h) displaying the resumed television broadcast program after completion of the animated video replacement advertising segment; and,
    (i) developing the viewer profile based on viewer interaction with the first replacement advertising segment, where developing the viewer profile includes:
        displaying an on-screen query of optional modifications to the first replacement advertising segment;
        receiving a viewer selection of at least one modification to the first replacement advertising segment;
        rendering the at least one modification to the first replacement advertising segment; and,
        retaining the viewer selection of the at least one modification to the first replacement advertising segment as part of the viewer profile; and,
    (j) automatically applying the previously retained viewer selection of the at least one modification to a second replacement advertising segment that is received after the first replacement advertising segment.

2. The method of claim 1 further comprising creating the viewer profile based on a set of preferences selected by the viewer.

3. The method of claim 1 wherein said modifications comprise color, component in displayed objects, viewing perspective, zoom, play-back speed, background audio sound track, and special effects.

4. The method of claim 1 wherein said modifications are accompanied by computer-generated special effects.

5. The method of claim 1, further comprising providing a plurality of audio accompaniments to the first advertising segment, and selecting the audio accompaniment based either on the viewer profile or on the music used most by the viewer on their set-top box or personnel music catalog on a storage device external to the set-top box.

6. The method of claim 1, where viewer interaction comprises applying a modification selected by the viewer to the first replacement advertising segment.

7. The method of claim 1, where viewer interaction occurs during the display of the first animated video replacement advertising segment.

8. A method for enhancing a television broadcast program comprising:
    (a) storing incoming programming data on a first memory storage, the programming data representing synchronization data for a plurality of sequential television broadcast segments in a television broadcast program;
    (b) storing information related to a plurality of replacement program segments on a second memory storage;
    (c) selecting a first replacement segment based on a viewer profile;
    (d) synchronizing the first replacement segment with one of said plurality of television broadcast segments;
    (e) receiving executable instruction sets for generating the selected replacement segments, and rendering on a local processor the selected first replacement segment by executing the executable instructions sets;

(f) blocking the display of the television broadcast segment;

(g) displaying the selected first replacement segment on a television display in place of the synchronized television broadcast segment;

(h) determining whether a next sequential television broadcast segment in the television broadcast program has commenced after end of the blocked television broadcast segment, determining whether the selected first replacement segment has ended, and if the selected first replacement segment has not ended, storing the next sequential television broadcast segment on a third memory storage from a beginning point, and displaying the next sequential segment from the beginning point after the selected first replacement segment has ended; and, (i) developing the viewer profile based on viewer interaction with the replacement segment; where developing the viewer profile includes:

displaying an on-screen query of optional modifications to the first replacement advertising segment;

receiving a viewer selection of at least one modification to the first replacement advertising segment;

rendering the at least one modification to the first replacement advertising segment; and, retaining the viewer selection of the at least one modification to the first replacement advertising segment as part of the viewer profile; and, (j) automatically applying the previously retained viewer selection of the at least one modification to a second replacement advertising segment that is selected after the first replacement advertising segment.

9. The method of claim 8, further comprising developing the viewer profile based on past selections of replacement segments.

10. The method of claim 8 further comprising developing the viewer profile based on a set of preferences selected by the viewer.

11. The method of claim 8 further comprising augmenting the viewer preferences based on the viewer's past selection of fast-forwarding or skipping through selected segments.

12. The method of claim 8, wherein the executable instruction sets for generating an advertising segment comprise executable programming code for rendering into an animated video segment by a client processor.

13. The method of claim 8, further comprising displaying an on-screen query of optional replacement segments, and selecting the desired replacement segments in response to a command received from the viewer.

14. The method of claim 8, wherein the programming data is received from data encoded with television broadcast program, from an electronic programming guide or from an internet server.

15. The method of claim 8 wherein the data representing the selected replacement segments comprise geometry and texture data for use with the executable instruction sets for rendering into an animated video segment by a client processor.

16. The method of claim 8, where viewer interaction comprises applying a modification selected by the viewer to the first replacement segment.

17. The method of claim 8, where viewer interaction occurs during the display of the first replacement segment.

18. A system for displaying enhanced television broadcast programs comprising:

a multimedia controller having:

a first memory storage for storing viewer profiles, a television broadcast signal tuner receiver, a communication port in communication with external sources of replacement advertising data, the advertising data comprising executable instruction sets for rendering a first animated video replacement advertising segment, the first animated video replacement advertisement being selected based on a viewer profile stored in the first memory storage, a second memory storage for storing a television broadcast stream, the television broadcast stream comprising a television broadcast program and a television broadcast advertisement for display during a break in the television broadcast program, a third memory storage for storing the replacement advertising data, a processor capable of rendering the first animated video replacement advertising segment by executing the executable instruction sets in the replacement advertising data and further capable of blocking the display of the television broadcast advertisement, such that the television broadcast advertisement is not displayed, a video display monitor in communication with the multimedia controller, the video display monitor configured to display the television broadcast program and the first animated video replacement advertising segment during a break in the television broadcast program; and a manual input device in communication with the multimedia controller, wherein:

the multimedia controller is further operative to determine whether the television broadcast program has resumed after the end of the television broadcast advertisement, to determine whether the first replacement advertising segment has ended, and if the first replacement advertising segment has not ended, to store the resumed television broadcast program on the first memory storage from a beginning point, and to display the resumed broadcast program from the beginning point; and, the multimedia controller is further operative to develop the viewer profile based on viewer interaction with the first animated video replacement advertising segment based on:

the video display monitor being further operative to display an on-screen query of optional modifications to the first animated video replacement advertising segment;

the manual input device being further operative to receive a viewer selection of at least one modification to the first animated video replacement advertising segment;

the processor being further operative to render the at least one modification to the first animated video replacement advertising segment;

the first memory storage being further operative to retain the viewer selection of the at least one modification to the first animated video replacement advertising segment as part of the viewer profile used in selecting the first animated video replacement advertising segment; and, the processor being further operative to automatically render the at least one previously received modification retained by the first memory storage to a second animated video replacement advertising segment that is selected after the first animated video replacement advertising segment.

19. The system of claim 18 further comprising a personal computer in communication with the multimedia controller.

20. The system of claim 18 further comprising a fourth memory storage for storing television broadcast programs in digitized format for later recall and display.

21. The system of claim 18 wherein the manual input device comprises a mouse, a joystick, a keyboard or a remote control.

22. The system of claim 21 wherein the remote control comprises a personal digital assistant having an infrared transceiver for communication with the multimedia controller, said personal digital assistant having a configurable display on a touch sensitive screen, said configurable display being configured to correspond to the active selections available to a user for a given images on the video display monitor.

23. The system of claim 18, where the processor is further configured to render a modification to the first animated video replacement advertising segment during viewer interaction with the first animated video replacement advertising segment.

* * * * *

UNITED STATES PATENT AND TRADEMARK OFFICE
CERTIFICATE OF CORRECTION

PATENT NO. : 7,631,327 B2  
APPLICATION NO. : 09/924669  
DATED : December 8, 2009  
INVENTOR(S) : Kelly L. Dempski It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1274 days.

Signed and Sealed this

Twenty-eighth Day of September, 2010

David J. Kappos  
*Director of the United States Patent and Trademark Office*